(12) United States Patent
Thorson et al.

(10) Patent No.: US 9,992,708 B2
(45) Date of Patent: Jun. 5, 2018

(54) MICRO TO MACRO IP CONNECTION HANDOVER

(71) Applicant: Google Technology Holdings LLC, Mountain View, CA (US)

(72) Inventors: Dean E. Thorson, Grayslake, IL (US); Naveen Aerrabotu, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 151 days.

(21) Appl. No.: 13/947,392

(22) Filed: Jul. 22, 2013

(65) Prior Publication Data

US 2014/0348127 A1   Nov. 27, 2014

Related U.S. Application Data

(60) Provisional application No. 61/826,067, filed on May 22, 2013.

(51) Int. Cl.
*H04W 36/00* (2009.01)
*H04W 36/14* (2009.01)
*H04W 84/10* (2009.01)

(52) U.S. Cl.
CPC ........ *H04W 36/0011* (2013.01); *H04W 36/14* (2013.01); *H04W 84/10* (2013.01)

(58) Field of Classification Search
CPC . H04W 8/087; H04W 28/0226; H04W 40/36; H04W 52/40; H04W 36/0011; H04W 36/14; H04W 84/10
See application file for complete search history.

(56) References Cited

U.S. PATENT DOCUMENTS

| | | | |
|---|---|---|---|
| 6,282,192 B1 * | 8/2001 | Murphy et al. | 370/352 |
| 6,285,884 B1 * | 9/2001 | Vaara | H04W 36/04 455/436 |
| 6,781,983 B1 * | 8/2004 | Armistead | 370/353 |
| 6,868,080 B1 * | 3/2005 | Umansky et al. | 370/354 |

(Continued)

FOREIGN PATENT DOCUMENTS

EP   1737192 B1   12/2006

OTHER PUBLICATIONS

International Search Report of PCT/US2014/036818 dated Jul. 22, 2014.

(Continued)

*Primary Examiner* — Chirag Shah
*Assistant Examiner* — Joshua Smith
(74) *Attorney, Agent, or Firm* — Colby Nipper

(57) ABSTRACT

Disclosed are a system and method for moving a connection from a localized network, e.g., a personal area network ("PAN"), to a different or larger network, e.g., a wide area network ("WAN"). In one aspect, wherein two devices are in communication on a PAN, each device uses the PAN to query the IPv6 WAN prefix assigned to each other device to which it is communicating on the PAN. The querying device then creates a globally routable IPv6 address for the desired communication and uses it to continue the connection after the device detects that the PAN is out of range. In an embodiment, one of the endpoint devices may determine that it has changed its IPv6 prefix and may transmit the new prefix to the other device through an out-of-band method such as the Short Message Service.

20 Claims, 6 Drawing Sheets

(56) References Cited

U.S. PATENT DOCUMENTS

| | | | |
|---|---|---|---|
| 7,003,298 B1* | 2/2006 | Jagadeesan | H04M 7/0057 370/331 |
| 7,055,173 B1 | 5/2006 | Chaganty et al. | |
| 7,302,496 B1* | 11/2007 | Metzger | H04L 29/12452 370/236 |
| 7,489,659 B2 | 2/2009 | Siorpaes et al. | |
| 7,729,327 B2 | 7/2010 | Yaqub | |
| 7,869,350 B1 | 1/2011 | Bryant et al. | |
| 8,379,528 B1 | 2/2013 | Xue et al. | |
| 2002/0105956 A1* | 8/2002 | Saito | H04L 63/12 370/401 |
| 2003/0114158 A1* | 6/2003 | Soderbacka et al. | 455/436 |
| 2004/0004957 A1* | 1/2004 | Rabipour et al. | 370/352 |
| 2004/0088544 A1* | 5/2004 | Tariq | H04L 63/0435 713/162 |
| 2004/0090937 A1* | 5/2004 | Chaskar et al. | 370/331 |
| 2004/0148428 A1* | 7/2004 | Tsirtsis | H04W 80/04 709/238 |
| 2004/0179489 A1* | 9/2004 | Suzuki | H04L 29/12311 370/328 |
| 2004/0179539 A1* | 9/2004 | Takeda | H04L 29/12301 370/401 |
| 2004/0202183 A1* | 10/2004 | Thubert | H04L 69/167 370/395.31 |
| 2004/0205211 A1* | 10/2004 | Takeda | H04L 63/126 709/230 |
| 2005/0096024 A1* | 5/2005 | Bicker | H04W 4/16 455/417 |
| 2005/0237983 A1* | 10/2005 | Khalil | H04L 63/061 370/338 |
| 2005/0271011 A1* | 12/2005 | Alemany | H04W 36/28 370/331 |
| 2007/0147399 A1* | 6/2007 | Deng et al. | 370/401 |
| 2007/0180483 A1* | 8/2007 | Popoviciu | H04L 61/6068 725/111 |
| 2008/0263353 A1* | 10/2008 | Droms | H04L 63/0428 709/245 |
| 2008/0317064 A1* | 12/2008 | Choi | H04W 80/045 370/466 |
| 2009/0034471 A1* | 2/2009 | Rosenblatt | H04W 36/0022 370/331 |
| 2009/0222582 A1 | 9/2009 | Josefsberg et al. | |
| 2009/0225761 A1* | 9/2009 | Sarikaya | H04L 29/12915 370/400 |
| 2010/0002652 A1* | 1/2010 | Kawakami | H04W 36/0011 370/331 |
| 2010/0008507 A1* | 1/2010 | Galante | H04L 63/068 380/278 |
| 2011/0007628 A1* | 1/2011 | Tochio | 370/224 |
| 2011/0255481 A1* | 10/2011 | Sumcad et al. | 370/329 |
| 2012/0030327 A1* | 2/2012 | Conrad | H04L 41/0213 709/223 |
| 2012/0177029 A1* | 7/2012 | Hillier et al. | 370/352 |
| 2013/0229922 A1* | 9/2013 | Li | H04L 43/0823 370/242 |
| 2014/0105040 A1* | 4/2014 | Baker | H04W 52/367 370/252 |
| 2014/0335872 A1* | 11/2014 | Yamada | 455/450 |
| 2015/0049669 A1* | 2/2015 | Petrescu | H04L 61/2015 370/328 |

OTHER PUBLICATIONS

International Preliminary Report on Patentability for International Application No. PCT/US2014/036818, dated Dec. 3, 2015.

* cited by examiner

MICRO TO MACRO IP CONNECTION HANDOVER

CROSS-REFERENCE TO RELATED APPLICATIONS

The present application claims priority to U.S. Patent Application 61/826,067, filed on May 22, 2013, and incorporated herein by reference in its entirety.

TECHNICAL FIELD

The present disclosure is related generally to connectivity between communication devices and, more particularly, to a system and method for migrating an ongoing connection from one network to another.

BACKGROUND

The first cellular telephone was not capable of anything other than making and receiving telephone calls, and early use of these devices was limited. However, the capabilities and adoption rate of mobile devices have steadily grown over the last half century. Today, more than seventy-five percent of the world's population enjoys the use of a cell phone, and the roles of such devices now extend far beyond simply making or receiving calls.

For example, mobile devices are now often configured to communicate over multiple networks such as a wide area network ("WAN"), a WiFi network, a personal area network ("PAN"), and one or more cellular networks. While device communications within any given network are straightforward, the migration of an ongoing connection from one network to another has been a challenge. While it may be possible to use a dedicated anchor device to maintain connectivity between two mobile devices, this would greatly increase the expense of maintaining the network as well as incur a delay in communications routed through the anchor point.

The present disclosure is directed to a system that may exhibit numerous distinctions over prior systems. However, it should be appreciated that any such distinction is not a limitation on the scope of the disclosed principles nor of the attached claims, except to the extent expressly noted. Additionally, the discussion of any problem in this Background section is not an indication that the problem represents known prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
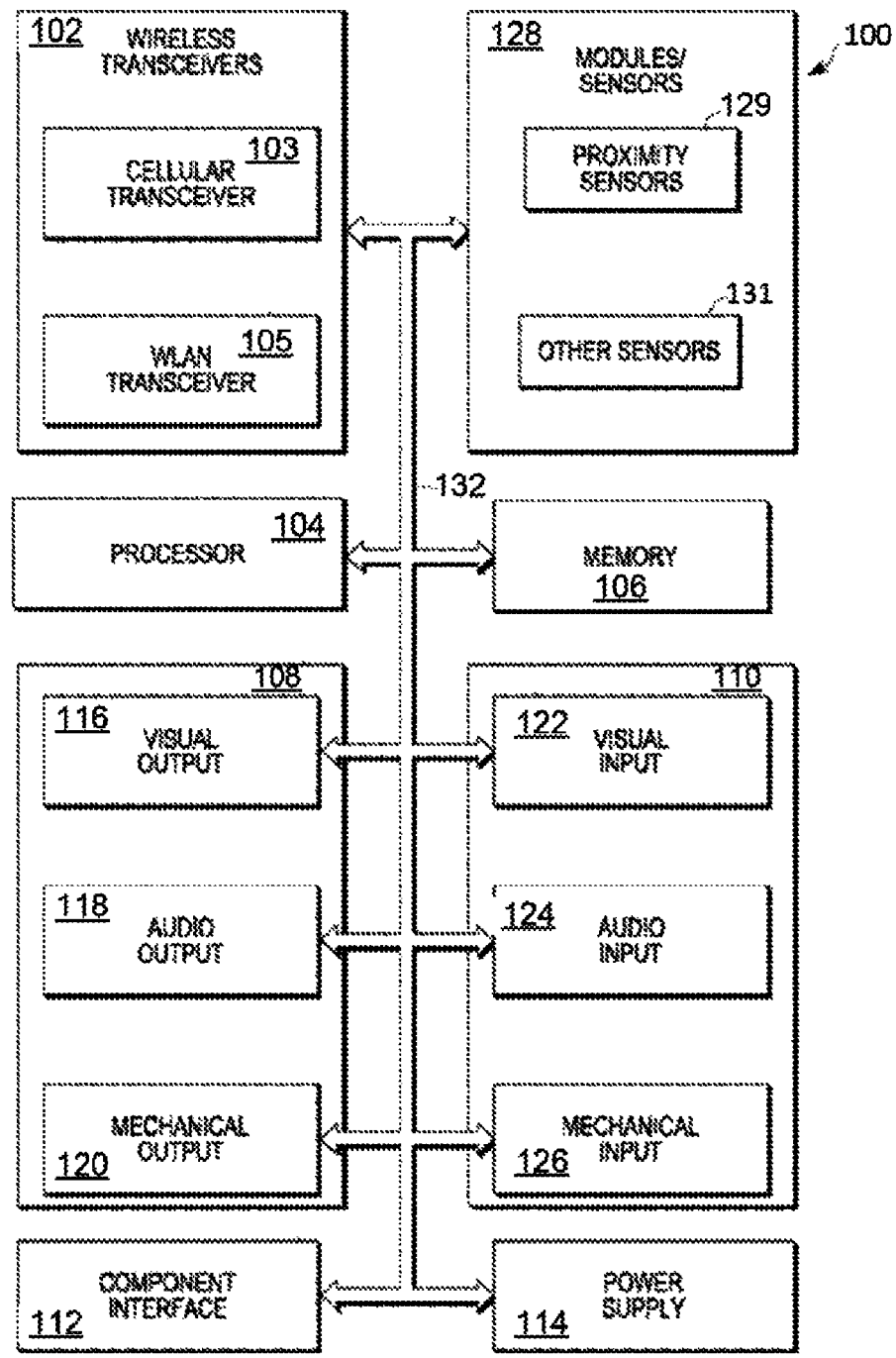
FIG. 1 is a generalized schematic of an example device within which the presently disclosed innovations may be implemented.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Localized, personal IP subnet communications are being proposed for devices to transmit information within a limited space. In social gatherings, this localized communication can be used for voting, for interaction between users to pass information, and so on. However, such interactions rely on localized communication capabilities, and these capabilities vanish when a user moves out of range of the local network. While it is possible to use Mobile IP handoff procedures, this would require a network element fixed with respect to the local network in order to perform an anchor function.

The disclosed principles provide a seamless way to move a connection from a localized network, e.g., a PAN, to a different or larger network, e.g., a WAN. A PAN typically interconnects devices within a useful range of a person, e.g., within a radius of about 30 feet. While the disclosed examples often refer to the first and second networks as a PAN and a WAN, it will be appreciated that the disclosed techniques are applicable to any two networks, at least the first of which is IP enabled.

In one aspect, wherein two devices are in communication on a PAN, one device uses the PAN to query the IPv6 WAN prefix assigned to each other device to which it is communicating on the PAN. The querying device then creates a globally routable IPv6 address for the desired communication and uses it to continue the connection after the device detects that the PAN is out of range. In particular, when persistent communication failure is detected on PAN by the device, it then switches communication channels to the WAN, using the previously obtained IPv6 prefix to establish follow-up communication to the desired endpoint. In an embodiment, the device periodically queries the PAN status to determine if the PAN has again become available, and when PAN availability is detected, the device then switches back to communicating over the PAN.

In general terms, this technique allows the device to control its routing out-of-band. As such, in a further embodiment, one of the endpoint devices may determine that it has changed its IPv6 prefix. If this happens and the devices lose communication, then the affected device may transmit the new prefix to the other device through an out-of-band method such as the Short Message Service ("SMS"). This allows the devices to continue communication after an IPv6 address change. The technique uses the established trust relationship between the devices to validate that the information is coming from an established communication partner to continue the communication.

Turning now to a more detailed description in view of the attached figures, the schematic diagram of FIG. 1 shows an exemplary device within which aspects of the present disclosure may be implemented. In particular, the schematic diagram 100 illustrates exemplary internal components of a mobile smart-phone implementation of a small touch-screen device. These components can include wireless transceivers 102, a processor 104, a memory 106, one or more output components 108, one or more input components 110, and one or more sensors 128. The processor 104 may be any of a microprocessor, microcomputer, application-specific integrated circuit, or the like. Similarly, the memory 106 may, but need not, reside on the same integrated circuit as the processor 104.

The device can also include a component interface 112 to provide a direct connection to auxiliary components or accessories for additional or enhanced functionality and a power supply 114, such as a battery, for providing power to the device components. All or some of the internal components may be coupled to each other and may be in communication with one another by way of one or more internal communication links 132, such as an internal bus.

The memory 106 can encompass one or more memory devices of any of a variety of forms, such as read-only memory, random-access memory, static random-access memory, dynamic random-access memory, etc., and may be used by the processor 104 to store and retrieve data. The data that are stored by the memory 106 can include one or more operating systems or applications as well as informational data. Each operating system is implemented via executable instructions stored in a storage medium in the device that controls basic functions of the electronic device, such as interaction among the various internal components, communication with external devices via the wireless transceivers 102 or the component interface 112, and storage and retrieval of applications and data to and from the memory 106.

With respect to programs, sometimes also referred to as applications, each program is implemented via executable code that utilizes the operating system to provide more specific functionality, such as file-system service and handling of protected and unprotected data stored in the memory 106. Although many such programs govern standard or required functionality of the small touch-screen device, in many cases the programs include applications governing optional or specialized functionality, which can be provided in some cases by third-party vendors unrelated to the device manufacturer.

Finally, with respect to informational data, this non-executable code or information can be referenced, manipulated, or written by an operating system or program for performing functions of the device. Such informational data can include, for example, data that are preprogrammed into the device during manufacture or any of a variety of types of information that are uploaded to, downloaded from, or otherwise accessed at servers or other devices with which the device is in communication during its ongoing operation.

The device can be programmed such that the processor 104 and memory 106 interact with the other components of the device to perform a variety of functions, including interaction with the touch-detecting surface to receive signals indicative of gestures therefrom, evaluation of these signals to identify various gestures, and control of the device in the manners described below. The processor 104 may include various modules and may execute programs for initiating different activities such as launching an application, data-transfer functions, and the toggling through various graphical user interface objects (e.g., toggling through various icons that are linked to executable applications).

The wireless transceivers 102 can include, for example as shown, both a cellular transceiver 103 and a wireless local area network transceiver 105. Each of the wireless transceivers 102 utilizes a wireless technology for communication, such as cellular-based communication technologies including analog communications, digital communications, and next generation communications or variants thereof, or peer-to-peer or ad hoc communication technologies such as HomeRF, Bluetooth, and IEEE 802.11 (a, b, g or n), or other wireless communication technologies.

Exemplary operation of the wireless transceivers 102 in conjunction with other internal components of the device can take a variety of forms and can include, for example, operation in which, upon reception of wireless signals, the internal components detect communication signals, and one of the transceivers 102 demodulates the communication signals to recover incoming information, such as voice or data, transmitted by the wireless signals. After receiving the incoming information from the transceivers 102, the processor 104 formats the incoming information for the one or more output components 108. Likewise, for transmission of wireless signals, the processor 104 formats outgoing information, which may or may not be activated by the input components 110, and conveys the outgoing information to one or more of the wireless transceivers 102 for modulation as communication signals. The wireless transceivers 102 convey the modulated signals to a remote device, such as a cell tower or an access point (not shown).

The output components 108 can include a variety of visual, audio, or mechanical outputs. For example, the output components 108 can include one or more visual-output components 116 such as a display screen. One or more audio-output components 118 can include a speaker, alarm, or buzzer, and one or more mechanical-output components 120 can include a vibrating mechanism for example. Similarly, the input components 110 can include one or more visual-input components 122 such as an optical sensor of a camera, one or more audio-input components 124 such as a microphone, and one or more mechanical-input components 126 such as a touch-detecting surface and a keypad.

The sensors 128 can include both proximity sensors 129 and other sensors 131, such as an accelerometer, a gyroscope, any haptic, light, temperature, biological, chemical, or humidity sensor, or any other sensor that can provide pertinent information, such as to identify a current location of the device.

Actions that can actuate one or more input components 110 can include, for example, powering on, opening, unlocking, moving, or operating the device. For example, upon power on, a "home screen" with a predetermined set of application icons can be displayed on the touch screen.

Figure 2:
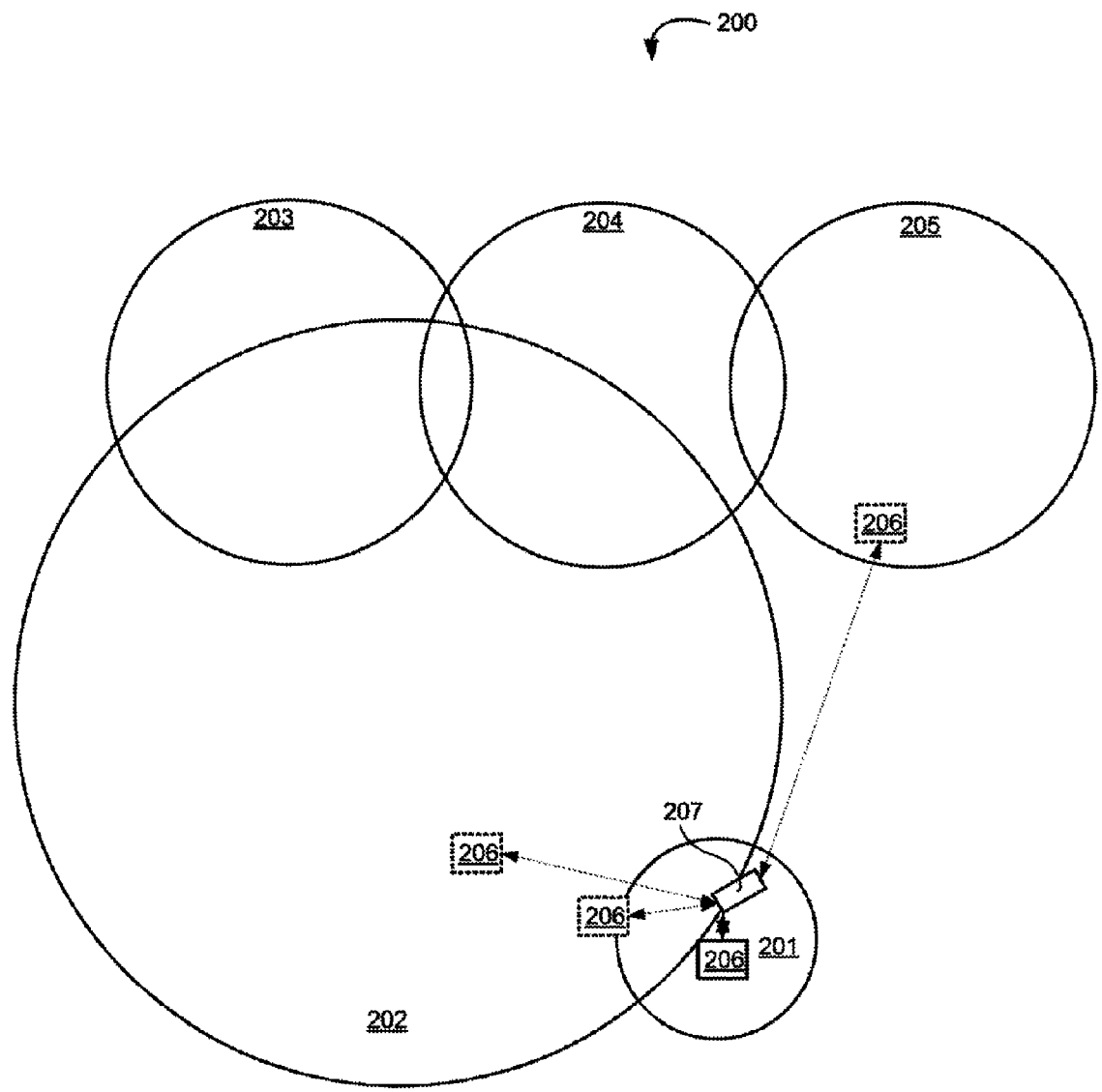
FIG. 2 is a simplified plan view of a representative environment in which the presently disclosed techniques may be practiced.

As noted above, mobile communications devices such as those described by way of example in FIG. 1, as well as other communications devices, may communicate over multiple networks, and the disclosed techniques allow such devices to maintain a connection when one device is transitioning between different networks. The simplified plan view shown in FIG. 2 represents an example environment in which the presently disclosed techniques may be implemented.

The illustrated example environment 200 includes a PAN 201 or other local network, a WAN 202 or other geographically larger network, and a cellular network including a plurality of cells 203, 204, 205. A first mobile communication device 206 and a second mobile communication device 207 are shown as initially being in communication via the PAN 201. Although the mobile communication devices 206, 207 are illustrated as being a personal communication device (e.g., a cellular phone, smart phone, etc.) and a tablet respectively, it will be appreciated that any type of mobile communication device may be used as either or both mobile communication devices 206, 207. In a further embodiment, only one of the mobile communication devices 206, 207 need be mobile, while the other may be fixed.

The ongoing communication may be intermittent or continuous. For example, the communication may involve voting, conversing, data exchange, and so on. Although the foregoing and the following discussion provide examples involving two mobile communication devices 206, 207, it will be appreciated that the disclosed principles may be applied with respect to communications involving any number of devices.

In the illustrated example, as noted above, the first device 206 and the second device 207 are initially in communication via the PAN 201. As one device, in this case the first device 206, moves out of range of the PAN 201, the device 206 begins to experience intermittent communication errors, as may the other device 207. At some point, the communication errors or failures may become persistent, as judged in comparison to a predetermined benchmark such as a 90% error-free rate at a data or packet level.

Once the communication failures meet the threshold to indicate a persistent failure of communications over the PAN 201, the mobile communication devices 206, 207 will be out of communication, and the connection established over the PAN 201 will be broken. However, in an embodiment, the mobile communication devices 206, 207 exchange routable communications information prior to either device moving out of range of the PAN 201.

In particular, in this embodiment, one device, for example the first device 206, queries the IPv6 prefix values for each destination to which a connection to the first device 206 on the PAN 201 exists. In the illustrated example, this aspect entails the first device 206 querying the IPv6 prefix value for the second device 207. Although any end-to-end routable protocol may be used to implement the disclosed principles, IPv6, used in the present example, is the latest version of IP.

IPv6 provides an IP address space many times larger than the address space under the prior IP versions. An IPv6 prefix encodes routing information for the device in question. In particular, the IPv6 prefix is a routing prefix combined with a subnet identifier, together contained in the most significant 64 bits of the IPv6 address. The bits of the subnet identifier field are used if desired by the network administrator to identify subnets within a particular network. The size of the routing prefix is variable, with a larger prefix size indicating a smaller subnet identifier size.

Continuing with the illustrated example, having obtained the IPv6 prefix from the second device 207, the first device 206 stores the prefix information for later use if necessary. In the illustrated example, the first device 206 moves to a second position barely within the PAN 201. At this point, the first device 206 may be experiencing intermittent communications errors. By the time the first device 206 has moved to third illustrated position outside of the PAN 201, it is experiencing persistent communication failure and has lost contact entirely with the second device 207.

Given the new lack of connection over the PAN 201, the first device 206 then uses the IPv6 prefix value previously obtained for the second device 207 to reestablish communication with the second device 207 over the WAN 202. The mobile communication devices 206, 207 will then execute any necessary communications to view the WAN 202, but the first device 206 will continue to evaluate the PAN status and will switch back to use of the PAN 201 when possible.

It is also possible for the first device 206 to move beyond the WAN 202 into a non-IP connected domain such as the cell 205 supporting Code Division Multiple Access 1× data, or otherwise. Given this situation, the first device 206 may attempt, in an embodiment, to continue the communications out-of-band, e.g., by sending an email or SMS message to the second device 207 containing non-IP contact point information if possible.

Further, it is possible that one device or the other may change, or have changed, its IPv6 prefix. In this case, the changed device may contact the other device out-of-band, e.g., through email or SMS messaging, to provide the new IPv6 prefix. The out-of-band communication may contain an identifier that the recipient device uses to associate the changed prefix with the sending device.

As mentioned above, the described techniques allow for one endpoint to migrate from first network, e.g., a PAN, to a second network, e.g., a WAN, without losing communication with a device on the first network. Similarly, the techniques are extendable to allow communications to continue even if both devices leave the original network.

Figure 3:
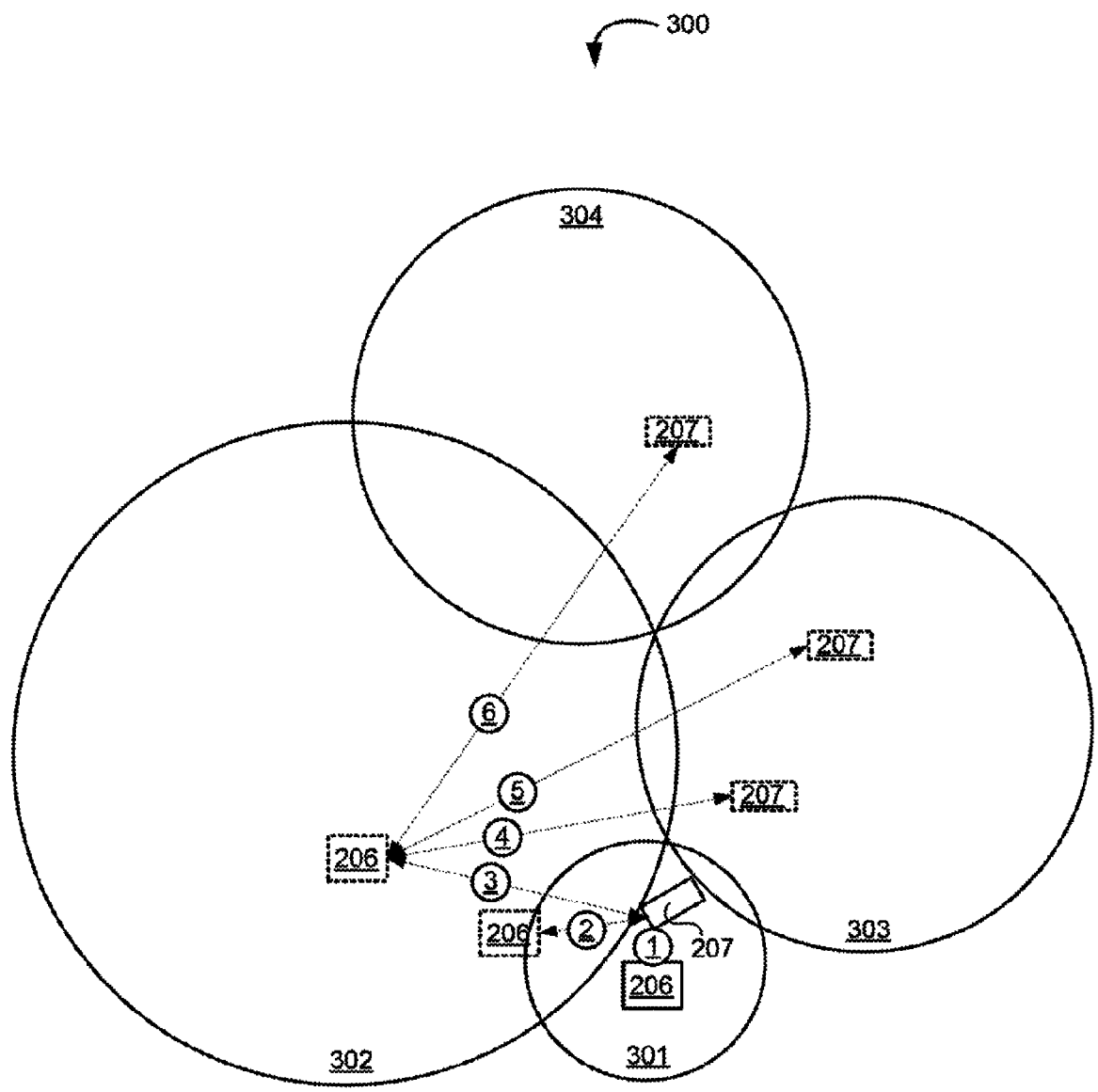
FIG. 3 is a simplified plan view of an alternative representative environment in which the presently disclosed techniques may be practiced.

FIG. 3 is a schematic diagram showing a time sequence of device movement in accordance with this aspect of the disclosure. The illustrated network diagram 300 shows the first mobile device 206 and the second mobile device 207 initially in communication on the PAN 301 (communication 1). Each device 206, 207 initially queries its counterpart to obtain an appropriate IPv6 prefix for connection-migration purposes. At some point, the first mobile device 206 moves to the edge of the PAN 301 while communicating (communication 2) and continues to move until connection through the PAN 301 is lost, and communication on a WAN 302 becomes possible for the first mobile device 206.

At this point, the first mobile 206 device uses the stored IPv6 prefix to reestablish communication with the second mobile device 207 (communication 3). However, the second mobile device 207 now moves from the PAN 301 to a nearby WAN 303. At this point the communications between the first mobile device 206 and the second mobile device 207 are reestablished by the second mobile device 207 using the IPv6 prefix for the first mobile device 206 previously obtained by the second mobile device 207. As such, the communications between the first mobile device 206 and the second mobile device 207 may then continue (communication 4). As the second mobile device 207 continues to move within range of the WAN 303, communications between the first mobile device 206 and the second mobile device 207 continue using the respective exchanged IPv6 prefix information (communication 5). Either or both of the mobile electronic devices 206, 207 may continue to monitor for PAN 301 connectivity and may again begin communicating with the other device over the PAN 301 if it detects itself to again be within range.

Figure 4:
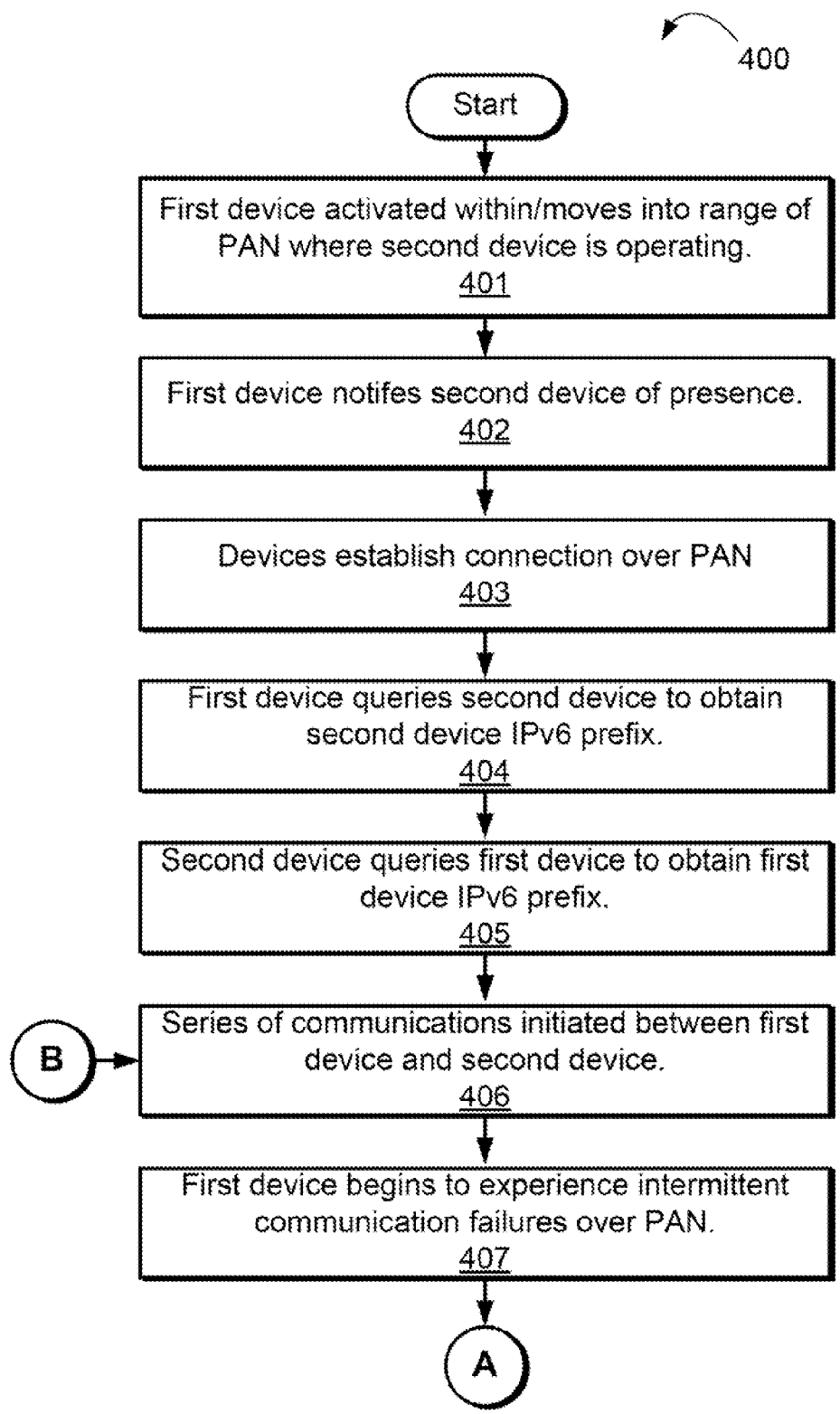
FIG. 4 is a flowchart illustrating a process of maintaining a connection between two or more devices when one or more devices move out of range of an initial network in an embodiment of the disclosed principles.
Figure 5:
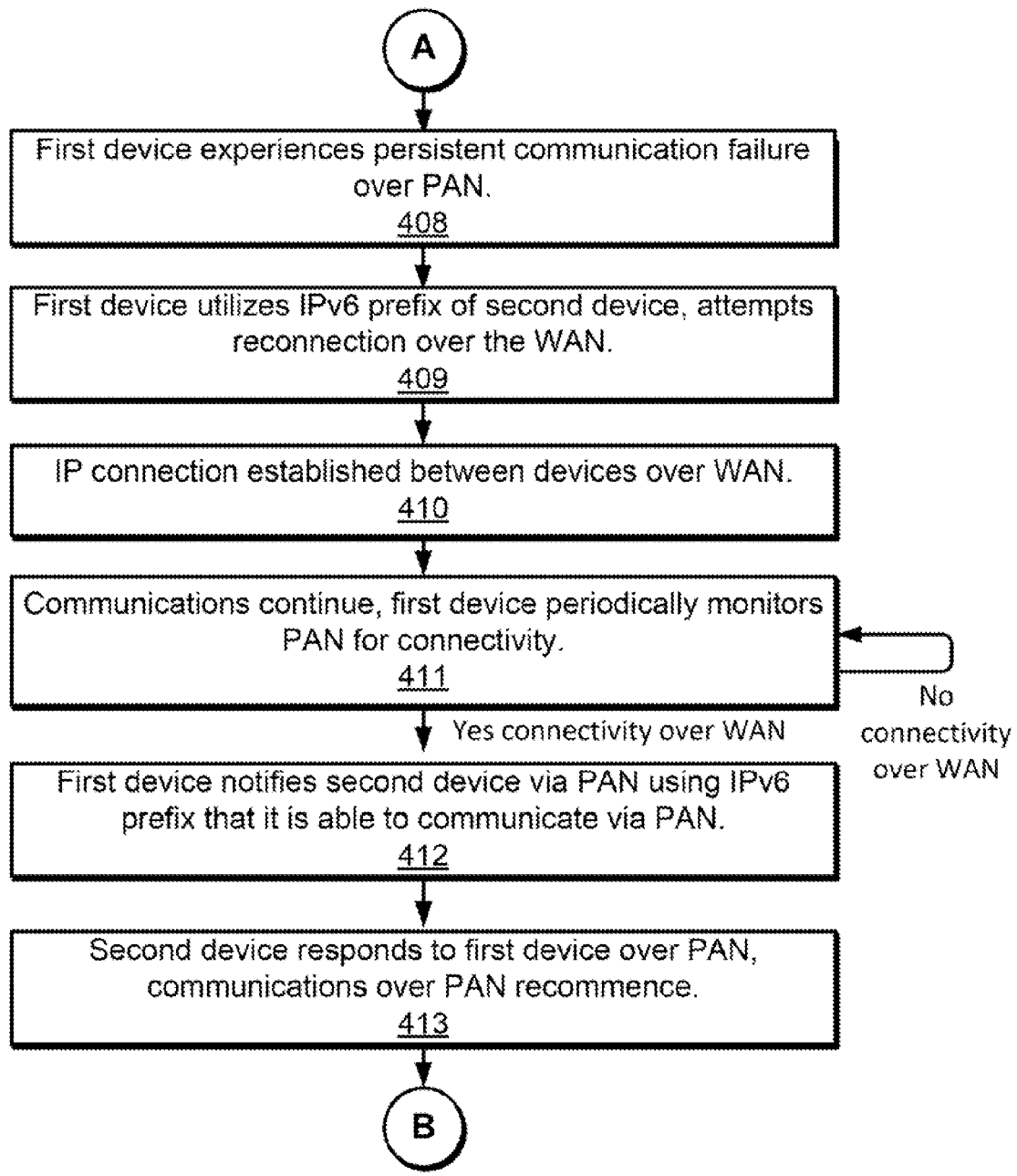
FIG. 5 is a flowchart illustrating a continuation of the process shown in FIG. 4.

Although it will be appreciated that the processes underlying the described functions within the context of network system 200 and network system 300 may be implemented in various ways, an exemplary process 400 is shown in FIG. 4. In particular, the flowcharts of FIGS. 4 and 5 show a process 400 for migrating a connection between two devices from a PAN to a WAN when one of them moves out of range of the PAN.

At stage 401 of the process 400, the first device is activated within range of a PAN in which the second device is operating. Alternatively, the first device may simply enter within range of the PAN. One device, e.g., the first device, announces itself to the other device, e.g., the second device, at stage 402. Subsequently at stage 403, the devices exchange connection information and establish a connection to one another over the PAN.

The first device then queries the second device to obtain the second device's IPv6 prefix at stage 404, and the second device similarly queries the first device to obtain the first device's IPv6 prefix at stage 405. An ongoing series of communications is initiated at stage 406 and is still ongoing when, at stage 407, the first device begins to experience intermittent communication failures with the second device over the PAN due to its location with respect to the PAN. As the first device moves further out of range of the PAN, it experiences communications failure over the PAN at stage 408 (FIG. 5).

At stage 409, the first device utilizes the IPv6 prefix of the second device to attempt to reconnect with the second device over the WAN. The second device responds to the first device at stage 410, and an IP connection between the devices over the WAN is established. As communications continue at stage 411, the first device periodically monitors the PAN for connectivity.

If at stage 411 the first device still does not detect sufficient connectivity via the PAN, the process 400 continues with IP communications at stage 411. Otherwise, the process 400 flows to stage 412, wherein the first device notifies the second device via the PAN, using the IPv6 prefix for the second device, of the fact that the first device is again able to communicate via the PAN. The second device responds to the first device over the PAN, and communications over the PAN recommence at stage 413.

While the foregoing example considers only primary actions during the connection migration, it will be appreciated that any number of subsidiary steps may also take place. For example, one device or the other may change its IPv6 prefix and may then report the new information to the other device, or the connection over the WAN may fail and may need to be recommenced over yet a larger network.

Figure 6:
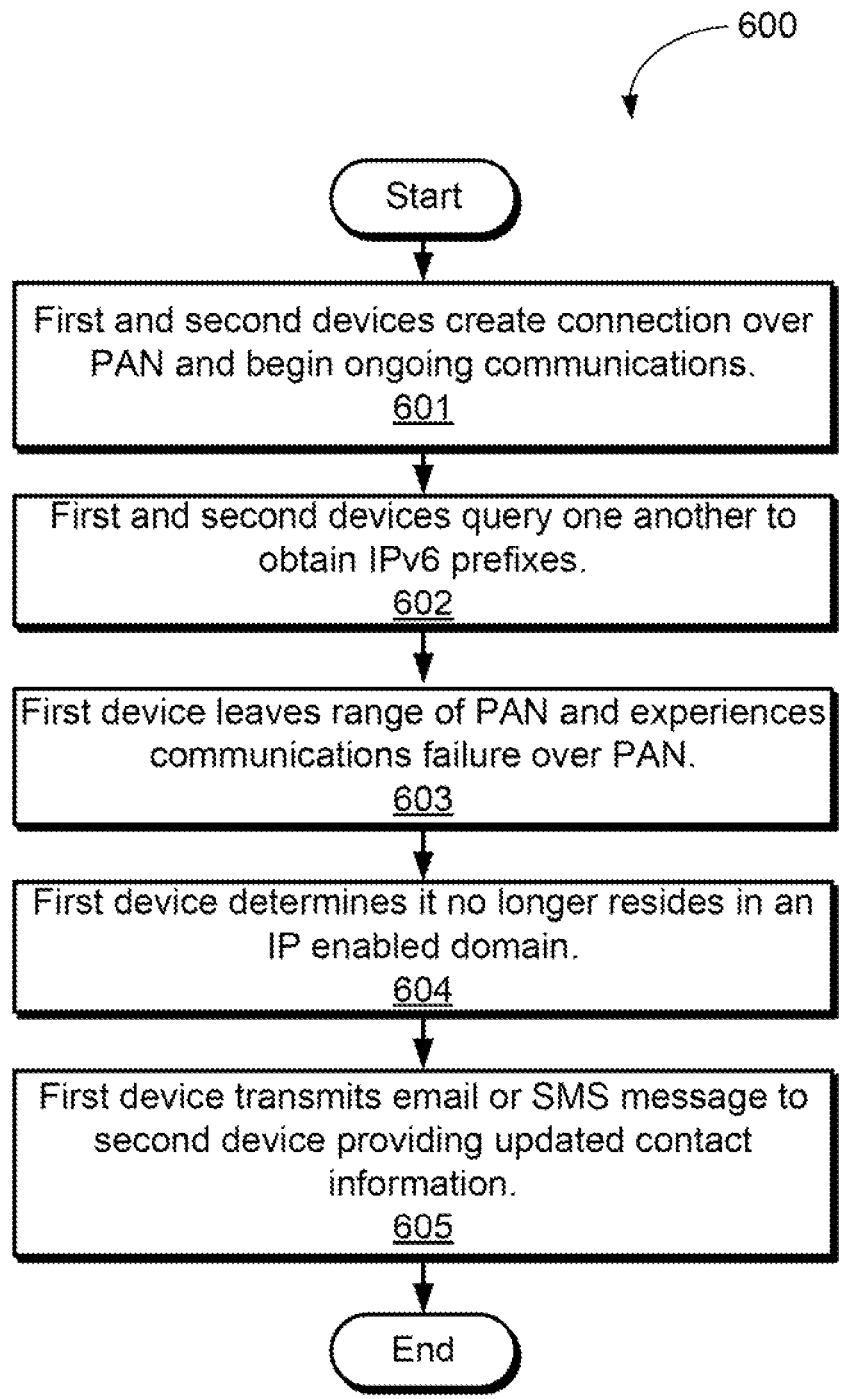
FIG. 6 is a flowchart illustrating a process for managing a connection between two devices when migrating to a non-Internet Protocol ("IP") network.

As noted above, it is also possible that the moving device may move to a non-IP domain. In this regard, FIG. 6 illustrates a flowchart of a process 600 for managing a connection between two devices when migrating from a PAN to a non-IP network directly or optionally via a WAN, e.g., due to device movement or failure of communications on the WAN. At stage 601 of the process 600, the first and second devices create a connection over the PAN and begin ongoing communications. The devices then query each other to obtain IPv6 prefixes at stage 602. At stage 603, the first device leaves the range of the PAN and experiences communications failure over the PAN.

At stage 604, the first device determines that it no longer resides in an IP-enabled domain but resides in a domain such as a cell domain wherein data connectivity is present only through other means such as email or SMS messaging. Thus at stage 605, the first device transmits an email or SMS message to the second device, which still resides on the PAN, providing updated contact information.

While the foregoing example considers only primary actions during the connection migration, it will be appreciated that any number of subsidiary steps may also take place. For example, one device or the other may change its IPv6 prefix and may then report the new information to the other device out-of-band via an email or SMS message. Additionally, the connection over the WAN may fail and may need to be recommenced over yet a larger network, in which case the devices again have the necessary information to resume communications.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of communicating wirelessly between a first device and a second device, the method comprising:
    establishing, at the first device, communications, over a first packet-switched wireless network, with the second device, the first packet-switched wireless network having a first useful range;
    querying, by the first device and over the first packet-switched wireless network, the second device to obtain a prefix of a first routable address that identifies the second device;
    creating, by the first device, from the prefix, a second routable address that identifies the second device usable for the second device to communicate over a second packet-switched wireless network, the second packet-switched wireless network having a second useful range, the second useful range longer than the first useful range;
    detecting, at the first device after the creating the second routable address, a failure of the communications, over the first packet-switched wireless network, with the second device;
    utilizing, by the first device in response to the detecting the failure of the communications, over the first packet-switched wireless network, with the second device, the second routable address to establish communications, over the second packet-switched wireless network, with the second device, wherein at least one of the first device or the second device is a mobile device;
    detecting, at the first device, after establishing the communications from the first device to the second device over the second packet-switched wireless network, that the first device is again able to communicate over the first packet-switched wireless network; and
    using, by the first device, in response to the detecting that the first device is again able to communicate over the first packet-switched wireless network, the second routable address to reestablish the communications between the first device and the second device on the first packet-switched wireless network.

2. The method of claim 1, wherein the second routable address is a globally unique address.

3. The method of claim 2, wherein the second routable address is an Internet Protocol version 6 address.

4. The method of claim 1, wherein the first packet-switched wireless network is a personal area network.

5. The method of claim 1, wherein the second packet-switched wireless network is a wide area network.

6. The method of claim 1, further comprising receiving, at the first device, a communication from the second device over the second packet-switched wireless network that the second device has also experienced the failure of the communications.

7. The method of claim 1, wherein the prefix comprises an Internet Protocol version 6 wide area network prefix associated with the second device.

8. The method of claim 1, wherein the detecting the failure of the communications comprises sensing at the first device a plurality of communication failures over the first packet-switched wireless network.

9. The method of claim 1, wherein the detecting the failure of the communications is in response to at least one of the first device or the second device moving outside of the first useful range.

10. A method of communicating wirelessly between a first device and a second device, the method comprising:
querying, by the first device and over a first packet-switched wireless network, the second device to obtain a prefix of a first routable address that identifies the second device, the first packet-switched wireless network having a first useful range;
creating, by the first device, from the prefix, a second routable address that identifies the second device, the second routable address usable for the first device to communicate over a second packet-switched wireless network, the second packet-switched wireless network having a second useful range, the second useful range longer than the first useful range;
communicating the second routable address over the first packet-switched wireless network from the first device to the second device;
detecting, at the first device after the communicating the second routable address, a failure of communications over the first packet-switched wireless network;
responding, by the first device, in response to the detecting the failure of the communications over the first packet-switched wireless network, to a first communication, sent by the second device to the second routable address, to establish communications over the second packet-switched wireless network, wherein at least one of the first device or the second device is a mobile device;
receiving, at the first device, after establishing the communications over the second packet-switched wireless network, a second communication that the second device is again able to communicate over the first packet-switched wireless network; and
using, by the first device, in response to the second communication, the second routable address to reestablish the communications on the first packet-switched wireless network.

11. The method of claim 10, wherein the second routable address is a globally unique address.

12. The method of claim 10, wherein the first packet-switched wireless network is a personal area network and the second first packet-switched wireless network is a wide area network.

13. The method of claim 10, wherein the first communication indicates that the second device has experienced the failure of the communications.

14. The method of claim 10, wherein the detecting the failure of the communications is in response to at least one of the first device or the second device moving outside of the first useful range.

15. A mobile electronic device for communicating wirelessly with a remote electronic device, the mobile electronic device comprising:

a memory configured to store a first routable address that identifies the mobile electronic device and a prefix of a second routable address, wherein the second routable address identifies the remote electronic device; and
a processor configured to receive the prefix, the processor further configured to produce, from the prefix, a third routable address that identifies the remote electronic device and to provide the first routable address to the remote electronic device, the processor further configured to communicate over a first packet-switched wireless network with the remote electronic device, to detect, after receiving the prefix, that the mobile electronic device is no longer able to communicate over the first packet-switched wireless network with the remote electronic device, and in response, to communicate to the remote electronic device over a second packet-switched wireless network using the third routable address, the processor further configured to detect, after establishing communications to the remote electronic device over the second packet-switched wireless network, that the mobile electronic device is again able to communicate over the first packet-switched wireless network and to use, in response to a detection that the mobile electronic device is again able to communicate over the first packet-switched wireless network, the third routable address to reestablish the communications to the remote electronic device on the first packet-switched wireless network, wherein the first packet-switched wireless network has a first useful range, the second packet-switched wireless network has a second useful range, and the second useful range is longer than the first useful range, and wherein the first routable address is usable for the mobile electronic device to communicate over the second packet-switched wireless network, and the third routable address is usable for the remote device to communicate over the second packet-switched wireless network.

16. The mobile electronic device of claim 15, wherein the first routable address and the second routable address are globally unique addresses.

17. The mobile electronic device of claim 16, wherein the first routable address and the second routable address are Internet Protocol version 6 addresses.

18. The mobile electronic device of claim 15, wherein the first packet-switched wireless network is a personal area network and the second packet-switched wireless network is a wide area network.

19. The mobile electronic device of claim 15, wherein the processor is configured to receive the prefix by querying the first packet-switched wireless network for an Internet Protocol version 6 wide area network prefix associated with the remote electronic device.

20. The mobile electronic device of claim 15, wherein the processor is configured to detect that the mobile electronic device is no longer able to communicate over the first packet-switched wireless network by sensing a plurality of communication failures over the first packet-switched wireless network.

* * * * *